United States Patent [19]

Yokoi

[11] Patent Number: 5,022,802
[45] Date of Patent: Jun. 11, 1991

[54] SYSTEM FOR GENERATING A TOOTH PROFILE USED IN A DIFFERENTIAL SPEED REDUCTION APPARATUS

[75] Inventor: Takao Yokoi, Mieken, Japan

[73] Assignee: Kabushiki Kaisha Shinkoseisakusho, Osaka, Japan

[21] Appl. No.: 398,390

[22] Filed: Aug. 25, 1989

Related U.S. Application Data

[62] Division of Ser. No. 318,250, Mar. 3, 1988, Pat. No. 4,966,573.

[30] Foreign Application Priority Data

Mar. 10, 1988 [JP] Japan .................................. 63-56984

[51] Int. Cl.$^5$ .................................................. B23F 5/20
[52] U.S. Cl. ................................... 409/52; 51/50 R; 51/103 C; 409/57; 409/165; 409/224
[58] Field of Search .................. 409/50, 52, 57, 164, 409/165, 168, 174, 198, 221, 224, 226, 228, 229; 269/63; 51/50 R, 103 R, 103 C, 129, 105 R, 105 GG, 48 R, 48 HE, 52 R, 287

[56] References Cited

U.S. PATENT DOCUMENTS

| | | | |
|---|---|---|---|
| 936,879 | 10/1909 | Flather | 409/57 |
| 2,161,268 | 6/1939 | Zimmermann | 409/57 |
| 3,841,199 | 10/1974 | Jepson et al. | 409/165 |
| 3,998,127 | 12/1976 | Romeu | 409/224 |
| 4,529,342 | 7/1985 | Babel | 409/224 |
| 4,625,377 | 12/1986 | Kavthekar | 409/165 |

*Primary Examiner*—Steven C. Bishop
*Attorney, Agent, or Firm*—Antonelli, Terry, Stout & Kraus

[57] ABSTRACT

The production of differential speed reduction apparatus, which uses a double-toothed gear including face cams having tooth profiles uniquely generated to secure efficient speed reduction. The speed reduction apparatus includes an input shaft carrying the double-toothed gear, a slant shaft wobbling in association with the rotation of the input shaft, a stationary face gear engageable with the face cams, a movable face gear secured to an output shaft, wherein the stationary face gear and the movable face gear have a roller-like or a convex-face contour.

2 Claims, 7 Drawing Sheets

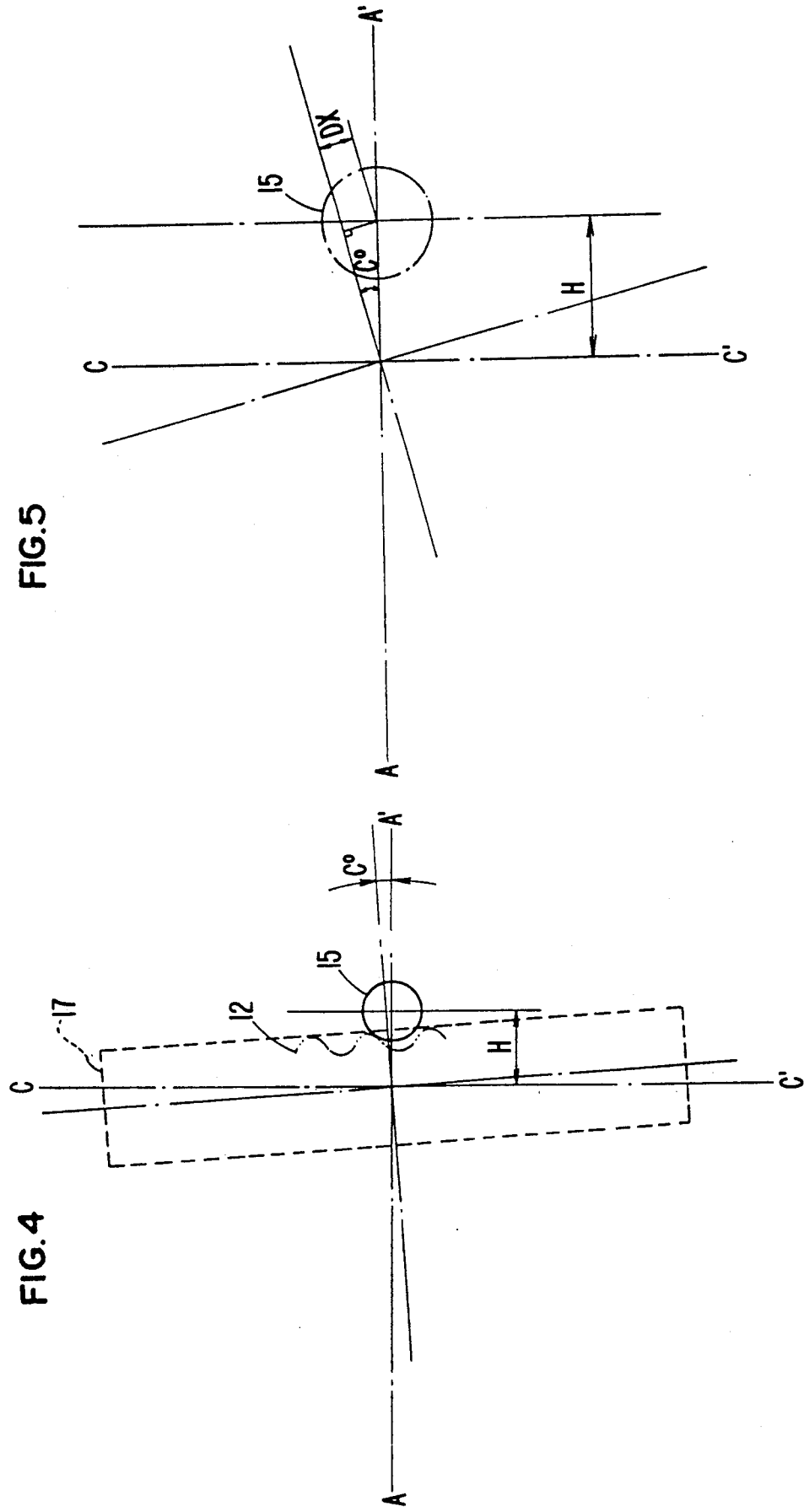

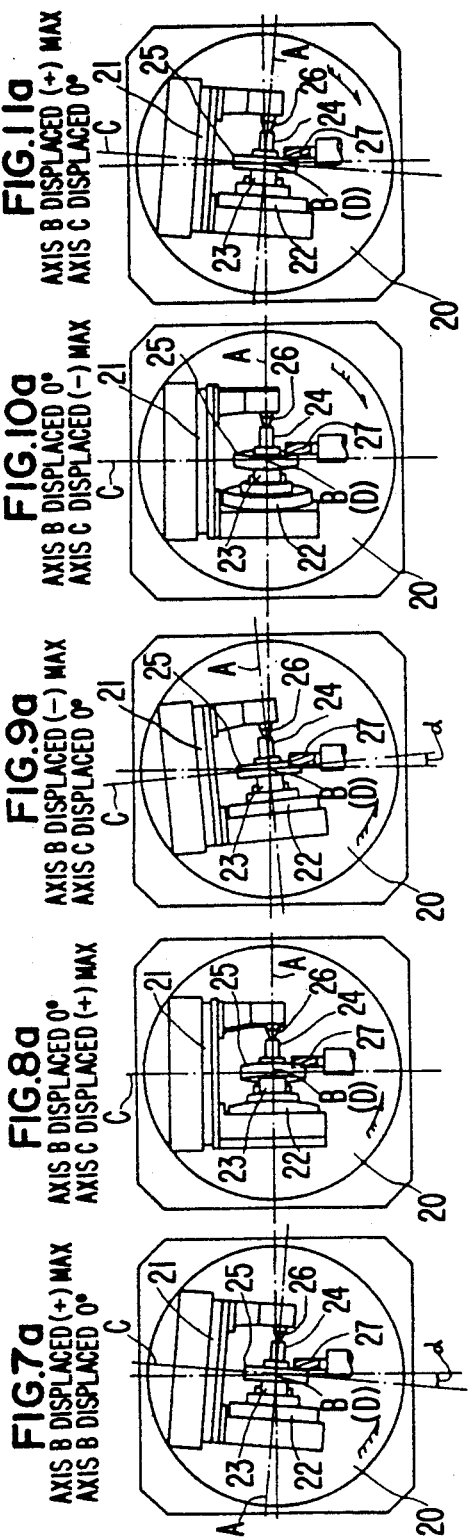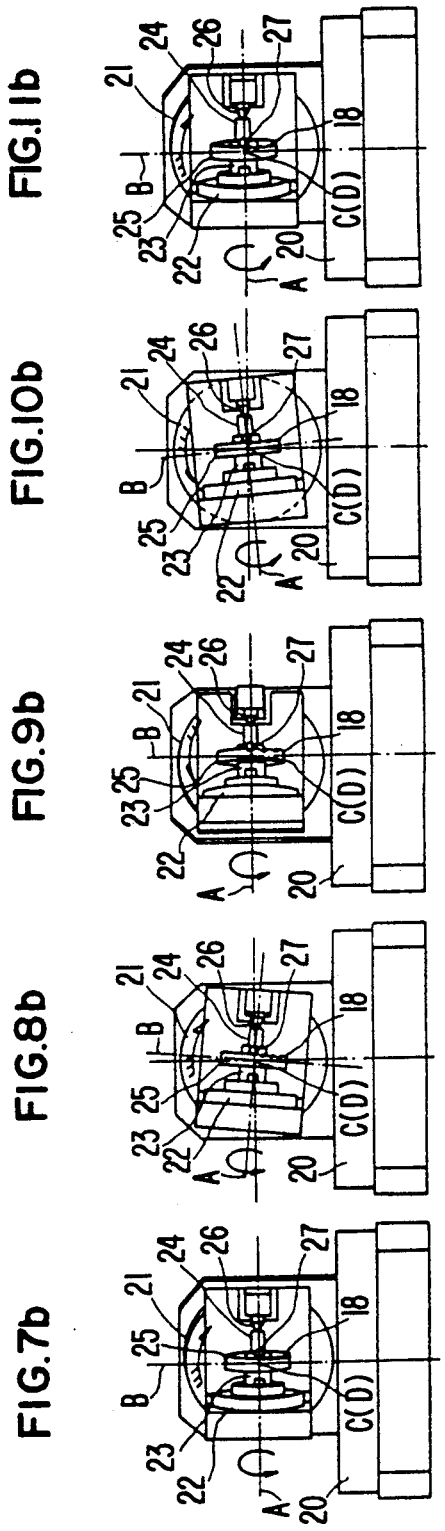

SYSTEM FOR GENERATING A TOOTH PROFILE USED IN A DIFFERENTIAL SPEED REDUCTION APPARATUS

This is a divisional of application Ser. No. 318,250, filed Mar. 3, 1988 now U.S. Pat. No. 4,966,573.

BACKGROUND OF THE INVENTION

The present invention relates to a differential speed reduction apparatus and double-toothed gear for use therein and, more particularly, to a differential speed reduction apparatus employing a double-toothed gear having a uniquely generated tooth profile.

It is known in the art to employ a double-toothed gear in the differential speed reduction apparatus, wherein the gear wobbles in association with the rotation of an input shaft. For example, Japanese Patent Publication (unexamined) No. 54-120347 discloses a typical example of the differential speed reduction apparatus of such kind.

This prior art apparatus comprises a double-toothed gear capable of wobbling in association with the rotation of the input shaft, a stationary gear, and a movable gear connected to the output shaft. These gears are engaged with each other in a unique manner, but the unique engagement requires a specially generated tooth profiles. As a matter of fact, it is not easy to generate such unique gear profiles as to be required by the prior art. This is the reason why the prior art apparatus has not been put into practice.

OBJECTS AND SUMMARY OF THE INVENTION

The present invention is directed toward solving the difficulty involved in the conventional system for generating tooth profiles used in differential speed reduction apparatus discussed above. Thus an object of the present invention is to provide a differential speed reduction apparatus including a double-toothed gear having a profile adapted for use in the differential speed reduction apparatus.

According to one aspect of the present invention, there is provided a differential speed reduction apparatus, which comprising a double-toothed gear including face cams at opposite sides, each face cam having a tooth profile generated so as to be adapted for use in the differential speed reduction apparatus, which includes an input shaft carrying the double-toothed gear, a slant shaft rotatively connected to the input shaft such that the slant shaft wobbles in association with the rotation of the input shaft, a stationary face gear engageable with the face cams of the double-toothed gear, a movable face gear secured to an output shaft, wherein the stationary face gear and the movable face gear have a roller-like or a convex-face contour, and wherein the face cams of the double-toothed gear have a profile which satisfies the following equations:

$$B = \tan^{-1}(\cos\theta \cdot \tan\alpha),$$

$$C = \tan^{-1}(\sin\theta \cdot \tan\alpha),$$

and $$\Delta A = D \cdot \theta / N.$$

where $\alpha$ = the angle at which the slant shaft is inclined to the axis A—A' of the input shaft;

B°, C° = the angles of the face cams obtainable from $\alpha$ and $\theta$ at which the input shaft rotates about the A—A';

$\Delta A° = D \cdot \theta / N$;

D = a gear ratio in the mating face cam and face gear; and

N = the numbers of teeth of each face cam.

According to another aspect of the present invention, there is provided a system for generating a tooth profile adapted for use in a differential speed reduction apparatus, the system comprising a B-axis NC rotary table reversibly rotative about an axis B by an angle $\alpha$, a C-axis NC rotary table provided on the B-axis rotary table, the C-axis table being reversibly rotative about an axis C by an angle $\alpha$, the axis C intersecting with the axis B at right angle, an A-axis NC rotary table provided on the C-axis rotary table, the A-axis rotary table being reversibly rotative about an axis A intersecting with the axis C at right angle, the A-axis rotary table including a rotary shaft, a gear blank holder secured to the rotary shaft, an end mill secured to the gear blank holder to cut the sides of a gear blank held by the gear blank holder, the end mill having a diameter equal to that of each face gear of a stationary gear and a movable gear, the A-axis rotary table being driven to enable the gear blank to rotate by $\Delta A°$ at which a slant shaft wobbles, and the B-axis rotary shaft and the C-axis rotary shaft being driven to enable the blank to reversibly rotate by angles B° and C°, thereby generating a desired tooth profile.

Other objects and advantages of the present invention will become more apparent from the following detailed description, when taken in conjunction with the accompanying drawings which show, for the purpose of illustration only, one embodiment in accordance embodiment in accordance with the present invention.

The double-toothed gear having uniquely generated profiles at opposite sides takes the form of a cam having a roller-like or convex contour. In this specification these portions are called face cams so as to distinguish them from ordinary types of face gears.

BRIEF DESCRIPTION OF THE DRAWINGS

FIGS. 2, 3a, 3b, 4 and 5 are diagrammatic views exemplifying a process for generating the tooth profiles in accordance with the present invention;

FIGS. 7a, 8a, 9a, 10a, 11a, are plan views illustrating a series of steps at which the tooth profile is progressively generated;

FIGS. 7b, 8b, 9b, 10b, 11b, are front views illustrating a series of steps at which the tooth profile is progressively generated;

DETAILED DESCRIPTION OF THE PREFERRED EMBODIMENT

Figure 1:
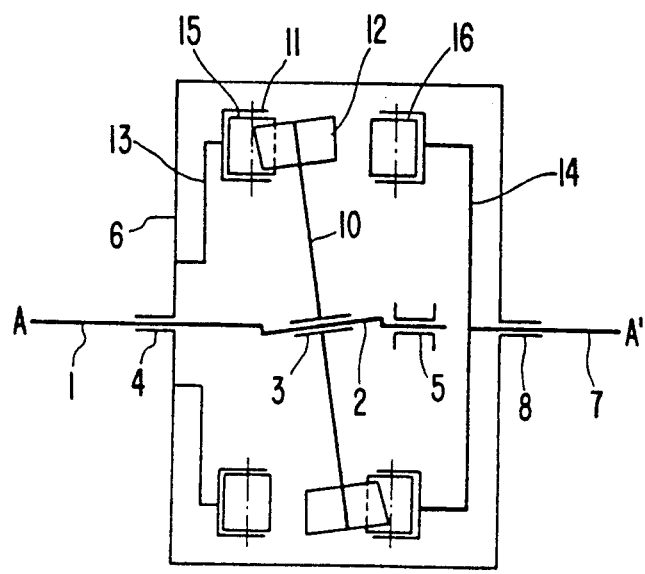
FIG. 1 is a diagrammatic view exemplifying the underlying principle of the differential speed reduction apparatus using a double-toothed gear including tooth profiles generated according to the present invention.

Referring to FIGS. 1, 6, 7a, and 7b the manner of generating the tooth profiles of face cams 11, 12 will be described:

FIG. 1 diagrammatically shows the underlying principle of a differential speed reduction apparatus employing the face cams 11, 12 whose profiles are generated according to the present invention. A double-toothed gear 10 having the face cams 11, 12 on opposite sides is rotatively carried on a slant shaft 2 connected to an input shaft 1 through a bearing 3. The input shaft 1 is carried on bearings 4, 5 such that it rotates about an axis A—A'.

A stationary face gear 13 and a movable face gear 14 each face the double-toothed gear 10. The stationary face gear 13 and the movable face gear 14 include rollers 15 and 16 engageable with the face cams 11 and 12, respectively, which rollers 15 are radially arranged about the axis A—A'. Instead of the rollers 15 and 16 convex-face contour teeth can be used. The stationary gear 13 is fixed to a casing 6, and the movable gear 14 is connected to an output shaft 7 such that it rotates relative to the casing 6. The output shaft 7 is concentric with the input shaft 1, and carried on a bearing 8.

The speed reduction apparatus is operated as follows:

When the input shaft 1 is rotated, the double-toothed gear 10 revolves with respect to the stationary face gear 13 and the movable face gear 14 in accordance with the wobbling motion of the slant shaft 3. Simultaneously it rotates about its own center by an amount depending upon the gear ratio between the rollers 15 and the face cam 11. However, since the face cam 11 is restrained in motion by the stationary face gear 13, the movable face gear 14 rotates by an amount depending upon the gear ratio between the rollers 16 and the face cam 12, plus or minus the axial rotations of the double-toothed gear 10. In this way the speed of rotation of the output shaft 7 is reduced. Herein the (+) means a case where the rotating direction of the movable face gear 14 and that of the axial rotation of the double-toothed gear 10 are the same, and the (−) means a case where they are in opposition. The speed reduction ratios are changeable depending upon the numbers of teeth of the face cams 11, 12, the number of the rollers 15 of the stationary face gear 13, and the number of the rollers 16 of the movable face gear 14. Now, suppose that:

$N_1$ = the number of rollers 15;
$N_2$ = the number of teeth of the face cam 11;
$N_3$ = the number of teeth of the face cam; and
$N_4$ = the number of rollers.

Therefore, the speed reduction ratio (i) is calculated as follows:

The rotation of the double-toothed gear 10 effected by the revolution of the face cam 11 relative to the rollers 15 is expressed by the equation:

$$i_1 = 1 - N_1/N_2.$$

The speed reduction ratio ($i_2$) between the face cam 12 and the rollers 16 is expressed by the equation:

$$i_2 = N_3/N_4.$$

The rotation of the rollers 16 effected by the revolution of the face cam 12 relative to the rollers 15 is expressed by the equation:

$$i_3 = 1 - N_3/N_4.$$

The total speed reduction ratio (i) is obtained from the following equation:

$$\begin{aligned} i &= i_1 \cdot i_2 + i_3 \\ &= (1 - N_1/N_2) \cdot (N_3/N_4) + \\ &\quad (1 - N_3/N_4), \\ &= 1 - N_1 \cdot N_3/N_2 \cdot N_4 \end{aligned}$$

where:
$N_1 = 19$;
$N_2 = 18$;
$N_3 = 19$; and
$N_4 = 20$
Therefore, $$\begin{aligned} i &= 1 - 19 \cdot 19/18 \cdot 20 \\ &= -1/360 \end{aligned}$$

when:
$N_1 = 18$;
$N_2 = 19$;
$N_3 = 19$; and
$N_4 = 20$.
Therefore, $$\begin{aligned} i &= 1 - 18 \cdot 19/19 \cdot 20 \\ &= 1/10. \end{aligned}$$

As is evident from the comparison between the two results, a slight change in gear ratios leads to a wide variation of speed reduction ratios. The (+) means that the input shaft 1 and the output shaft 7 rotate in the same direction, and the (−) means that they rotate in the opposite directions.

Figure 2:
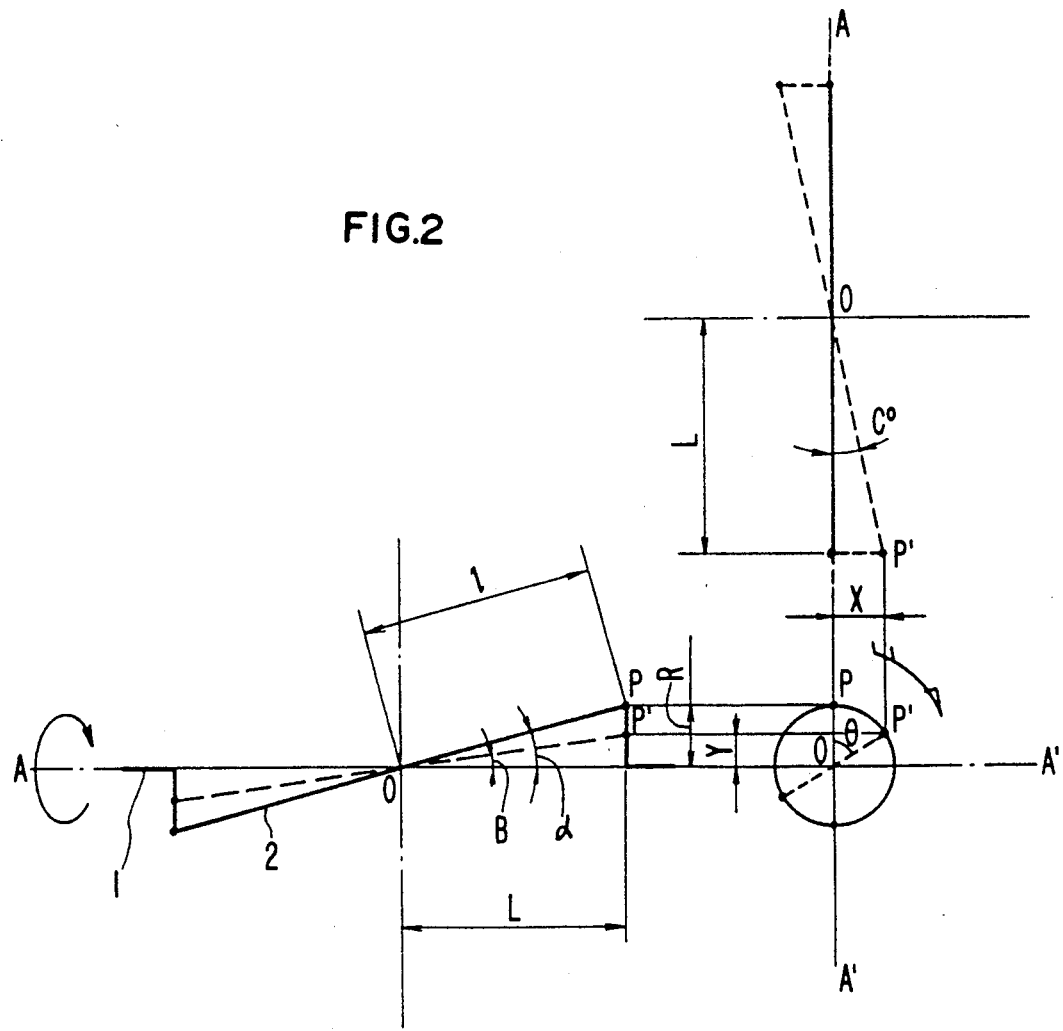

The manner of generating the tooth profiles of the face cams 11, 12 will be described:

In accordance with the regular rotation of the input shaft 1 the face cams 11, 12 are also rotated by equal angles under certain conditions. Since the face cams 11, 12 are arranged in a plane perpendicular to the slant shaft 2, the angular displacement of the slant shaft 2 becomes an important factor to consider for generating the tooth profile of the cam faces 11 and 12. Now, the slant shaft 2 and the input shaft 1 will be considered by reference to FIG. 2.

The slant shaft 2 is inclined at an angle of $\alpha°$ relative to the axis A—A' of the input shaft 1, and rotates about it by equal angles. Suppose that there is a point (P) spaced by a distance l from the center O of the slant shaft 2 where it intersects with the axis A—A' and that the point (P) rotates by an angle of $\theta°$ in a clockwise direction to shift to point (P'). The angles between the slant shaft 2 and the axis A—A' are B° and C° are obtained in the following manner:

A horizontal component L of the distance l on the axis A—A' is expressed by the equation:

$$L = l \cdot \cos \alpha. \tag{1}$$

Suppose that a vertical component is Y and a horizontal component is X, each is expressed by the equations:

$$R = L \cdot \tan \alpha, \quad (2)$$

$$X = R \cdot \sin \theta, \text{ and} \quad (3)$$

$$Y = R \cdot \cos \theta. \quad (4)$$

Therefore, $$\tan B = Y/L,$$

and $$\tan C = X/L.$$

Substituting these for X and Y in (3) and (4) above results in the following equation:

$$B = \tan^{-1}(R \cdot \cos \theta / L) \quad (5)$$

and $$C = \tan^{-1}(R \cdot \sin \theta / L). \quad (6)$$

Substituting $L = R/\tan \alpha$ of (2) for L, $$B = \tan^{-1}(R \cdot \cos \theta \cdot \tan \alpha / R), \quad (7)$$

$$\therefore B = \tan^{-1}(\cos \theta \cdot \tan \alpha),$$

$$C = \tan^{-1}(R \cdot \sin \theta \cdot \tan \alpha / R), \quad (8)$$

$$\therefore C = \tan^{-1}(\sin \theta \cdot \tan \alpha).$$

In this way the equations (7) and (8) are obtained. Herein, $\alpha$ is a constant. Therefore, the angles B° and C° vary depending upon values derived from the equations (7) and (8) substituted by angular displacements $\theta$.

Next, the angular displacement of the face cam 11 will be obtained:

The face cam 11 is angularly displaced in association with the input shaft 1, and rotates about its own center by differences between the number of the rollers 15 (number of teeth) $N_1$ and the number of teeth $N_2$ of the face cam 11. Let the difference in the number of teeth be D. Then, $D = N_1 - N_2$, wherein $N_1$ is a constant. Therefore, the rotations of the face cam 11 is $D/N_2$. This value can be derived in terms of angular displacement. Now, let an angular displacement of the face cam 11 be A for one rotation of the input shaft 1, then:

$$A = D \cdot 360°/N_2. \quad (9)$$

When the input shaft 1 rotates by $\theta°$, then:

$$\Delta A = A \cdot \theta/360 = D \cdot 360 \cdot \theta/N_2 \cdot 360, \quad (10)$$
$$= D \cdot \theta/N_2$$

Since D and $N_2$ are constants, it is understood that $\Delta A°$ varies in proportion to the angular displacement $\theta$ of the input shaft 1.

The values of $\Delta A°$, angles B° and C° represent the angular displacement of the face cam 11 engageable with the rollers 15. It is derived from this that the equations (4) and (6) are formulas for generating the tooth profile.

Figure 6:
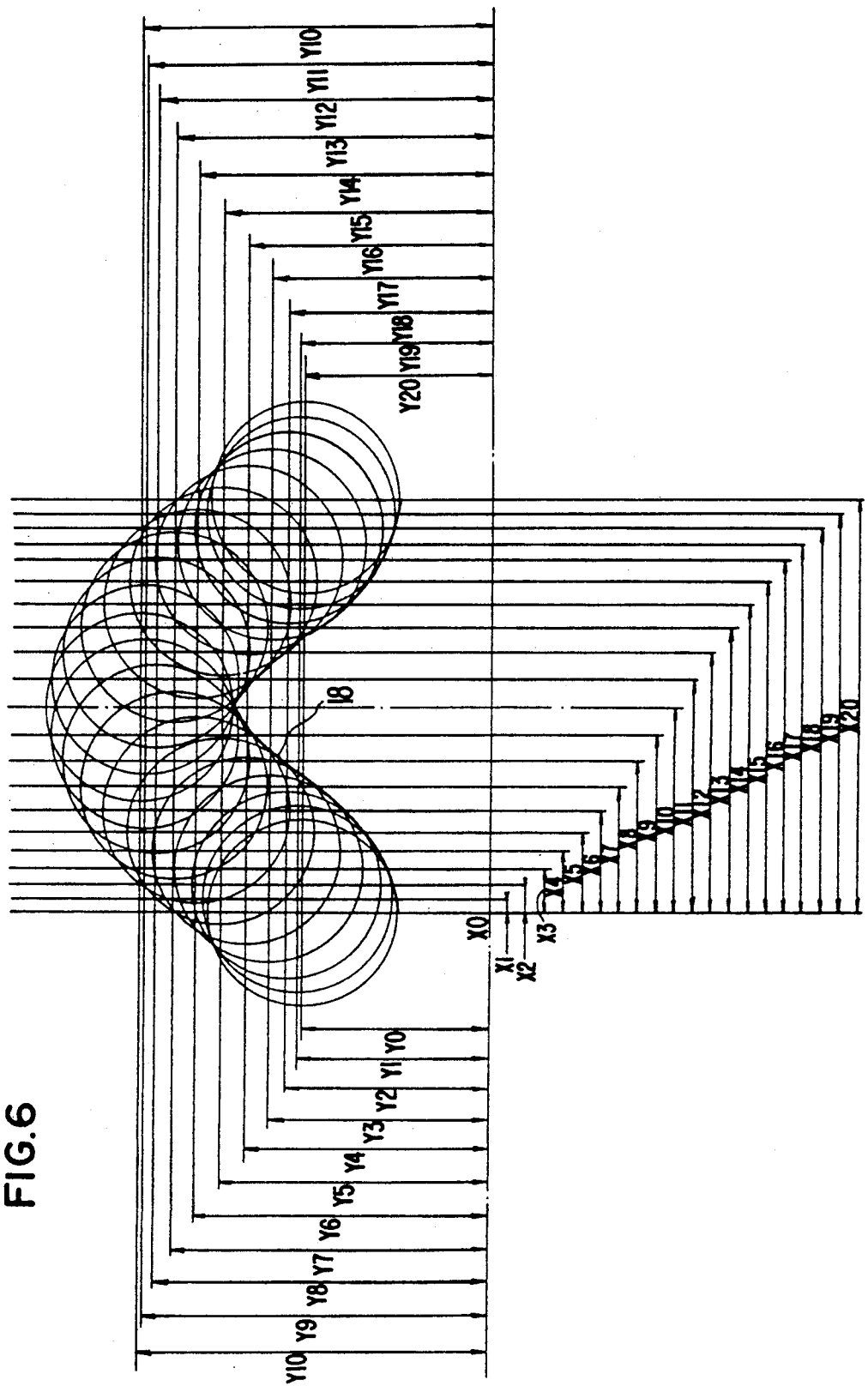
FIG. 6 is a view showing the development of the tooth profile.

The curves for generating the tooth profile in accordance with these equations become three-dimensional, not planar. With reference to FIGS. 3a, 3b, 4, 5, and 6, the development of the approximate tooth profile of the face cam 11 will be described:

In FIG. 6 it is presumed that the face cam 11 is stationary whereas the rollers rotate though the face cam 11 actually wobbles while rotating.

Figure 3A:
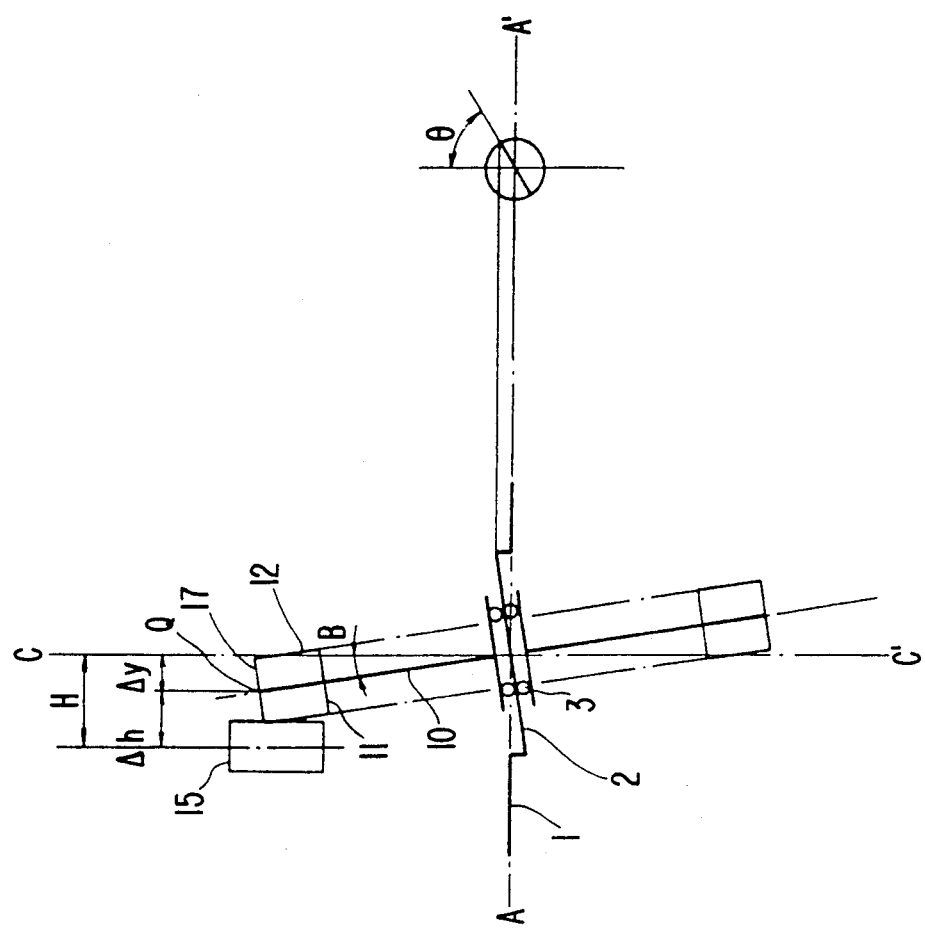
Figure 3B:
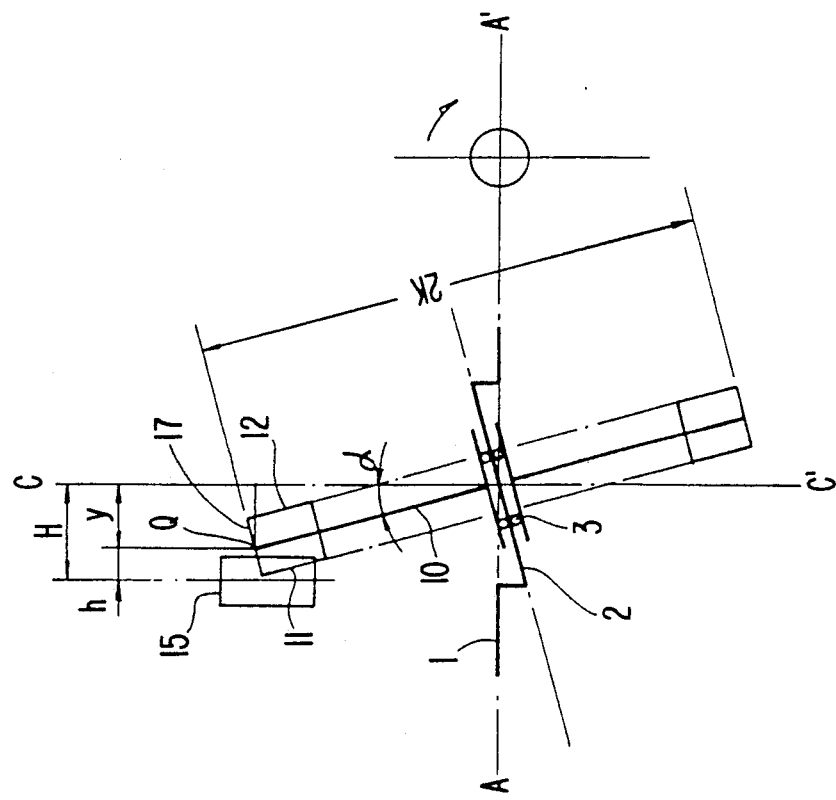

In FIGS. 3a, 3b it is presumed that the face cam 11 is provided with a cylindrical member 17 concentric with the slant shaft 2, the cylindrical member 17 having a radius of K. Suppose that the cylindrical member 17 moves over a distance $\Delta S$ when the face cam 11 rotates by $\Delta A°$, then:

$$\Delta S/2\pi K = \Delta A/2\pi, \text{ and}$$

$$\Delta S = \Delta A 2 \cdot K. \quad (11)$$

Substituting the equation (10) for $\Delta A$ in the equation (11) results in the following:

$$\Delta S = D \cdot \theta \cdot K/N_2. \quad (12)$$

The angular displacement $\theta$ of the input shaft 1 is constant, which consists of one rotation divided by n. With the substitution of $\theta = 2 \cdot \pi/n$ the variations of tooth profile can be generated. Substituting this value for the equation (12) results in the following relationship:

$$\Delta S = 2 \cdot \pi \cdot K \cdot D/n \cdot N_2. \quad (13)$$

If the tooth profile is to be recognized by unrolling the cylindrical member 17, the decline of the face cam caused by an angular displacement of the axis C must be taken into consideration. FIG. 4 shows a state where the axis C is in the maximum angular displacement, and FIG. 5 is an enlarged view of the main portion of FIG. 4. Suppose that a displacement of the roller from the axis of the face cam is DX. Then:

$$DX = H \cdot \sin C°. \quad (14)$$

If the matter is considered on the development view, the center of the roller is derived from by substituting the equation (14) for the equation (13), that resulting in:

$$Xn = \Delta S - DX. \quad (15)$$

A displacement in the direction of Y axis is approximately expressed in terms of the angle B.

First, a distance y displaced in parallel with the axis A—A' in FIG. 3a is determined, on the basis of which the figure is drawn.

In FIGS. 3a, 3b suppose that a straight line C—C' passes through the center O of the slant shaft 2 and intersects with the axis A—A' at right angle, that the line C—C' is spaced from the axis of the rollers 15 by a distance H, and that the axial center Q of the cylindrical member 17 of the face cam 11 is displaced by h from the angle B. Then:

$$h = K \cdot \sin \alpha,$$

$$y = H - h,$$

and $$\Delta h = K \cdot \sin B.$$

Therefore, $$\Delta Y = H - \Delta h. \quad (16)$$

When the tooth profile is divided by n, Yn is expresed by the following equation:

$$Yn = H - K \cdot \sin\{\tan^{-1}(\cos2\ \pi/n) \cdot \tan\alpha\}. \quad (17)$$

From the equations (15) and (17) n=20 and D=1 are respectively obtained, on the basis of which Xn and Yn are calculated. The values of Xn are plotted along a horizontal axis, and as shown in FIG. 6, circles having a diameter equal to that of the roller 15 are drawn with the centers as the intersections of Xn and Yn. In this way a desired tooth profile is approximately obtained.

Referring to FIGS. 7a, 7b, 8a, 8b, 9a, 9b, 10a, 10b, 11a and 11b, the manner of generating a tooth profile on the basis of angles ΔA°, B° and C° will be described by way of an example:

A B-axis NC rotary table 20 rotates about a vertical axis B by an angle α in a clockwise and counterclockwise direction, wherein the angle α is equal to the decline of angle of the slant shaft 2. A C-axis NC rotary table 21 rotates about a horizontal axis C by an angle α in a clockwise and counterclockwise direction, wherein the angle α is equal to the decline of angle of the slant shaft 2. A third rotary or A-axis NC rotary table 22 has a rotary shaft 23 which rotates about an axis A (horizontal) intersecting with the axis C at right angle. The shaft 23 includes a blank holder 24 whereby a blank 25 is maintained and a tail stock 26 is adapted to bear a free end of the rotary shaft 13.

An end mill 27 has the same diameter as that of the roller 15, and is disposed at the same place as the roller 15 fixed in such a manner as to cut the sides of the blank 25. In FIGS. 7a, 7b–11a, 11b, D is the central axis along which the NC operation is carried out, the central axis passing through the intersections of the axes A, B and C. The working is initiated from the intersections of these axes.

To initiate the operation, the B-axis NC rotary table 20 is rotated until it is angularly displaced by an angle α from the central axis D. At this stage the C-axis rotary table 21 takes a horizontal posture, under which the end mill 27 comes into engagement with the gear blank 25.

Figure 12:
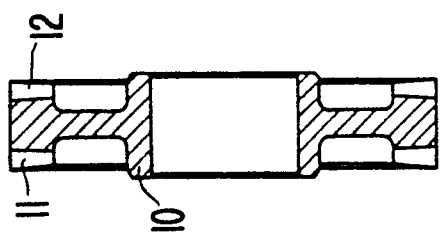
FIG. 12 is a vertical cross-section through face cams having the tooth profiles generated according to the present invention.
Figure 13:
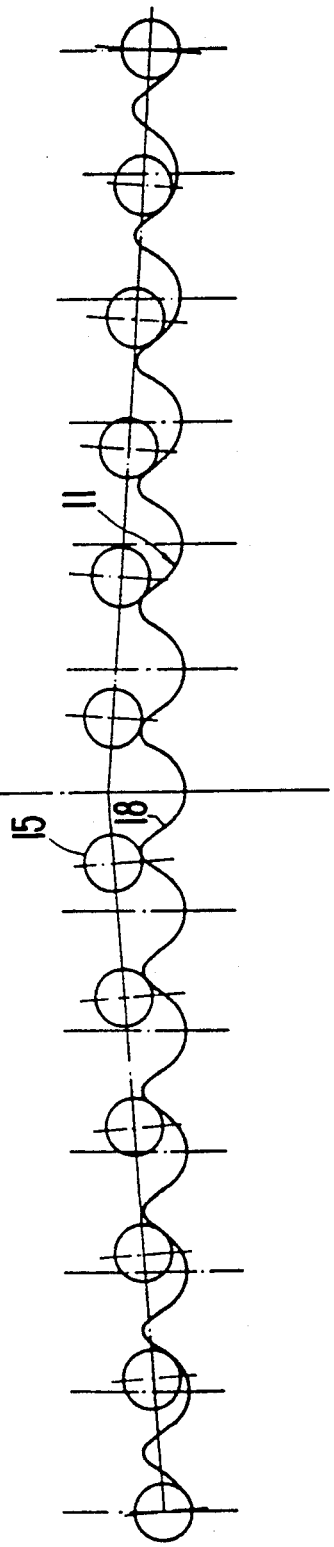
FIG. 13 is a view showing a development of the face cam of FIG. 12.

Next, the A-axis NC rotary table 22 is driven to enable the blank 25 to rotate intermittently by Δα. The B-axis NC rotary table 20 and the C-axis NC rotary table are rotated by the angle B and C, respectively. As shown in FIG. 9, when the B-axis NC rotary table 20 is displaced by α from the line D in the opposite direction, it is reversely rotated, and returned to the original position shown in FIGS. 7a, 7b by way of the position shown in FIGS. 10a, 10b and 11a, 11b in the course of which the gear blank 25 is cut by the end mill 27 to have a tooth profile 18 on its side. Subsequently the same procedure is repeated until N₂ teeth is formed on the face cam 11. Then, the other side of the gear blank 25 is cut in the same manner until N₃ teeth are formed on the face cam 12. In this way a double-toothed gear 10 is finished as shown in FIG. 12. FIG. 13 shows an unrolled phase (development) of the tooth profile of the double-toothed gear 10.

Figure 14:
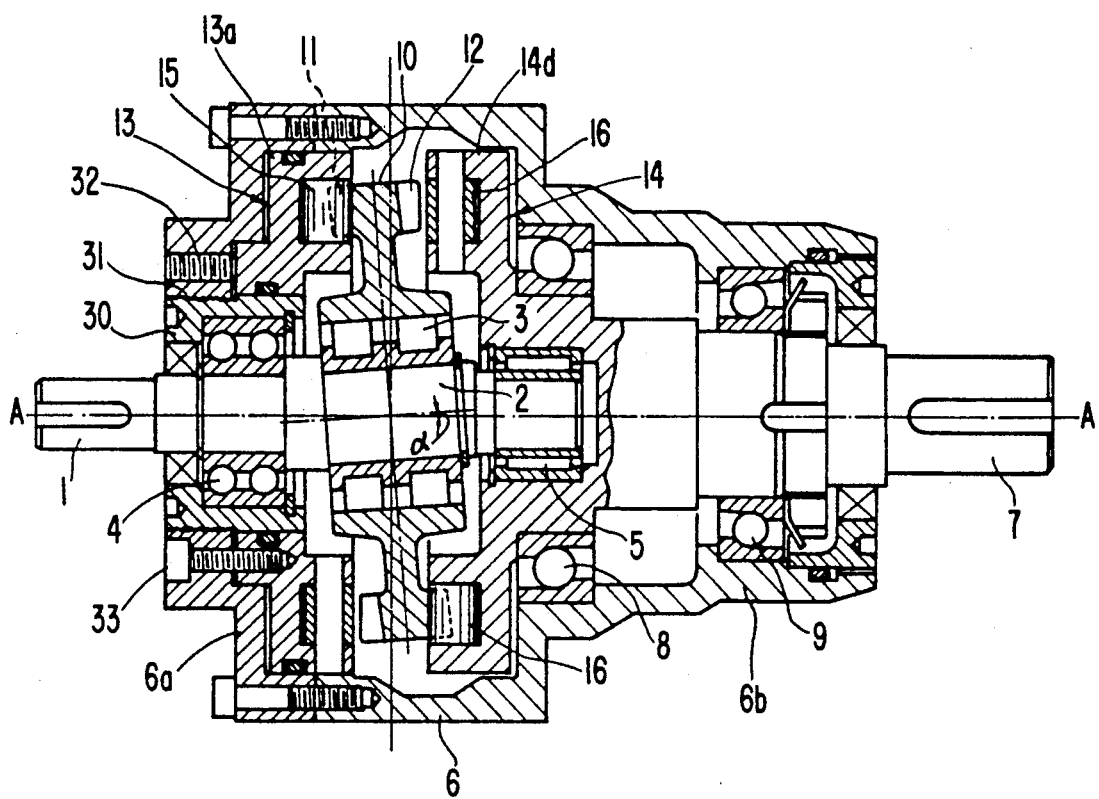
FIG. 14 is a cross-sectional view showing a main part of a differential speed reduction apparatus using the double-toothed gear.

FIG. 14 shows a differential speed reduction apparatus using the double-toothed gear 10 produced in the above-mentioned manner, in which the principle illustrated in FIG. 1 underlies.

The input shaft 1 is provided with a slant shaft 2 in its middle portion which is inclined by an angle α. The slant shaft 2 carries the double-toothed gear 10 through bearings 3. The input shaft 1 is carried on the casing 6 through bearings 4 and needle bearings 5 such that it rotates about the axis A—A'. The bearings 4 are accommodated in a housing 30, which is threadably secured to a casing cover 6a at threads 31 such that the bearings 4 are adjustable along the axis A—A' together with the housing 30.

The output shaft 7 is concentric of the input shaft 1, and carried in a sleeve 6b through bearings 8 and 9.

The double-toothed gear 10 is interposed between the stationary face gear 13 and the movable face gear 14, the latter being provided with $N_1$ rollers 15 and $N_4$ rollers 16, respectively, which are radially arranged on discs 13a and 14a with respect to the axis A—A'. The rollers 15 and 16 are engageable with the face cams 11 and 12 of the double-toothed gear 10.

The disc 13a is secured to the casing 6 by an adjustable screw 32 and a fixed screw 33 in such a manner as to be adjustable along the axis A—A'. The threads 31 of the housing 30, the adjustable screw 32 and the fixed screw 33 constitute a backlash compensating entity whereby the rollers 15 are properly in mesh with the face cam 11.

The disc 14a is rotatively mounted on the inner end of the output shaft 7.

The differential speed reduction ratio (i) of the apparatus is expressed by the equation:

$$i = 1 - N_1 \cdot N_3 / N_2 \cdot N_4$$

As is evident from the foregoing description, the differential speed reduction apparatus according to the present invention has a number of advantages; namely, a high reduction ratio; a low inertia, i.e., the input shaft has a relatively small moment of inertia; a minimized possible backlash by adjustability of the face cams along the axis A—A'; and a minimum, if any, energy loss by virtue of the concentric arrangement of the input shaft and the output shaft. Moreover, the speed reducing efficiency is enhanced because of the rolling contact, and the face cams can withstand a high load, with one third of the teeth transmitting a torque enabling a large torque transmission. Additionally, the face cams are compact in size and lightweight because of the relatively small diameter, and the face cam can withstand a long period of use because they are not exposed to friction. Also, the entire structure of the apparatus is simple and therefore easy to maintain, and the rolling contact allows the cam faces to rotate at high speeds.

What is claimed is:

1. A system for generating a tooth profile adapted for use in a differential gear reduction apparatus comprising a double-toothed gear including face cams at opposite sides, an input shaft carrying the double-toothed gear, a slant shaft rotatably connected to the input shaft in such a manner that the slant shaft wobbles upon a rotation of the input shaft, a stationary face gear engageable with the face cams of the double-toothed gear, a movable face gear secured to an output shaft, wherein the stationary face gear and the movable face gear have one of a roller and a convex-face contour, the system comprising a B-axis NC rotary table reversibly rotatable about an axis B by an angle α, a C-axis NC rotary table provided on the B-axis rotary table, the C-axis NC rotary table being reversibly rotatable about an axis C by an angle θ, the axis C intersecting the axis B at a right angle, an A-axis NC rotary table provided on the C-axis NC rotary table, the A-axis NC rotary table being reversibly rotatable about an axis A intersecting the axis C at a right angle, the A-axis NC rotary table including a rotary shaft, a gear blank holder, an end mill for cutting the sides of a gear blank held by the gear blank holder, the end mill having a diameter equal to a diameter of the stationary face gear and the movable face gear, the A-axis rotary table being driven to enable the gear blank to rotate by $\Delta A°$ at which the slant shaft wobbles, and the B-axis NC rotary table and the C-axis NC rotary table are driven to enable the gear blank to respectively reversibly rotate by the angles $\alpha$ for generating a desired tooth profile.

2. A system for generating a tooth profile according to claim 1, wherein the face cams of the double-toothed gear have a provide satisfying the following equations:

$$B° = \tan^{-1}(\cos\theta \cdot \tan\alpha)$$

$$C° = \tan^{-1}(\sin\theta \cdot \tan\alpha)$$

$$\Delta A° = D \cdot \theta / N$$

where:
- $\alpha$ = the angle at which the slant shaft is inclined to an axis A—A' of the input shaft;
- $B°$, $C°$ = the respective predetermined angle of reverse rotation by the B-axis and the C-axis NC rotary table for determining the angle of the face cams obtainable from $\alpha$ and $\theta$ at which the input shaft rotates about the axis A—A;
- $D$ = a gear ratio in the mating face cam and face gear; and
- $N$ = the numbers of teeth of the face cams.

* * * * *